United States Patent [19]

Davis

[11] Patent Number: 4,843,615

[45] Date of Patent: Jun. 27, 1989

[54] CPFSK COMMUNICATION SYSTEM EMPLOYING NYQUIST-FILTERED MODULATOR/DEMODULATOR

[75] Inventor: Robert C. Davis, Indialantic, Fla.

[73] Assignee: Harris Corp., Melbourne, Fla.

[21] Appl. No.: 47,149

[22] Filed: May 8, 1987

[51] Int. Cl.$^4$ .................. H04L 27/14; H03K 9/06
[52] U.S. Cl. .................. 375/80; 375/94; 375/99; 375/46; 375/79
[58] Field of Search .............. 375/51, 103, 79, 46, 375/60, 99, 42, 78, 94, 80

[56] References Cited

U.S. PATENT DOCUMENTS

| | | | |
|---|---|---|---|
| 3,679,983 | 7/1972 | Theriot | 375/80 |
| 4,003,002 | 1/1977 | Snijders et al. | 375/60 |
| 4,229,821 | 10/1980 | de Jager et al. | 375/53 |
| 4,388,595 | 6/1983 | Brooks | 375/80 |
| 4,392,231 | 7/1983 | Henry | 375/80 |

Primary Examiner—Robert L. Griffin
Assistant Examiner—Marianne Huseman
Attorney, Agent, or Firm—Antonelli, Terry & Wands

[57] ABSTRACT

An improved narrowband continuous phase modulation system incorporates a filtering mechanism in the transmitter and receiver sites that enables the radiated spectrum characteristic to have a substantially reduced response at frequencies other than the channel of interest and thereby achieve a significant reduction in unwanted adjacent channel interference. Each of the transmitter and receiver sites contains a square root Nyquist filter upstream and downstream of the modulator and demodulator, respectively. The output of the Nyquist filter in the receiver is coupled to an accumulator which sums successive samples of the demodulated data signals (including noise). The noise is reduced as a consequence of its inherent negative correlation properties (utilized in the accumulation of successive samples of the recovered signal).

16 Claims, 3 Drawing Sheets

CPFSK COMMUNICATION SYSTEM EMPLOYING NYQUIST-FILTERED MODULATOR/DEMODULATOR

FIELD OF THE INVENTION

The present invention relates in general to communication systems and is particularly directed to an improved filtering mechanism for limited spectrum continuous phase digital data transmission systems.

BACKGROUND OF THE INVENTION

Narrowband communication links, such as those incorporated in line-of-sight (including satellite) data transmission systems, commonly employ a continuous phase modulation digital signalling scheme in order to achieve efficient use of the available data channel and to take advantage of the constant envelope characteristics of the modulation format and thereby avoid unwanted degradation of the transmitted signal due to the use of non-linear amplifier components (e.g. travelling wave tubes). A diagrammatic illustration of a digital data communication system employing continuous phase modulation (such as that described in U.S. Pat. No. 4,071,829 entitled "Coherent Phase Detector Using a Frequency Discriminator" and assigned to the assignee of the present application) is shown in FIG. 1 as including an input link 11 over which (M-ary) digital data is coupled to a modulator for transmission. As described in the above-referenced patent the modulator contains a baseband aperture filter 12 for applying a finitely shaped (i.e. squarewave) input signal (of the form $kd\Phi_m/dt$ to a voltage controlled oscillator 13 which produces a continuous phase outputsignal of the form $\cos(\Omega_o t + \Phi_m(t))$. The output of voltage controlled oscillator 13 is coupled to an RF amplifier (TWT) 14 for transmission over a communication link (e.g. satellite channel) 15 to a receiver site.

At the receiver the incoming signal, which has most likely been subjected to some form of signal degradation such as intersymbol interference caused by multipath propagation, is demodulated by applying the received signal to a coherent phase detector 16. As an example, the coherent phase detector comprises a limiter-discriminator, which recovers the phase modulation component of the form $d\Phi_m t/dt$, followed by an integrator from which the original M-ary digital data is derived.

In the demodulation/data recovery scheme described in the above-referenced patent, the integration function is accomplished by coupling the output of a limiter-discriminator through an aperture filter 17 to an accumulator 18. Each of the aperture filters associated with the transmit voltage-controlled oscillator and that coupled with the data recovery accumulator has a finite baseband time duration T corresponding to the inverse of the pulse repetition rate of the digital data. The accumulator sums successive samples (sampled every T seconds to derive data samples at T, 2T, 3T, ..., NT seconds) in order to obtain an output representative of the accumulated phase of the transmitted RF signal and thereby permit recovery of the original M-ary digital data.

Now, although the communication scheme described in the above referenced patent provides an improved mechanism for digital data communication through continuous phase modulation, the spectrum of signals produced as a result of the use of a finite impulse response aperture filter mechanism (at the input to the modulator's VCO) and radiated by the transmitter contains sidelobes of substantial magnitude (adjacent to a mainlobe at the transmitted center frequency) which limit the extent to which multiple information channels may be stacked together within the narrowband communication channel without being subjected to unwanted mutual interference.

SUMMARY OF THE INVENTION

In accordance with the present invention, there is provided an improved continuous phase modulation system which incorporates a filtering mechanism in the transmitter and receiver sites that enables the radiated spectrum characteristic to have a substantially reduced response at frequencies other than the channel of interest and thereby achieve a significant reduction in unwanted adjacent channel interference. To this end the present invention replaces each of the aperture filters of the patented system with a square root Nyquist filter, the impulse response of which effectively consists of a single main lobe and reduced alternate polarity ripple components that successively pass through zero at a prescribed periodicity corresponding to the pulse repetition rate of the digital data being transmitted. The accumulator function of the patented system, which would appear to be an anomaly in a system employing a non-finite filtering mechanism (aperture filters) is retained. By retaining the accumulation function, noise is reduced as a consequence of its inherent negative correlation properties (utilized in the accumulation of successive samples of the recovered signal).

DETAILED DESCRIPTION

Figure 1:
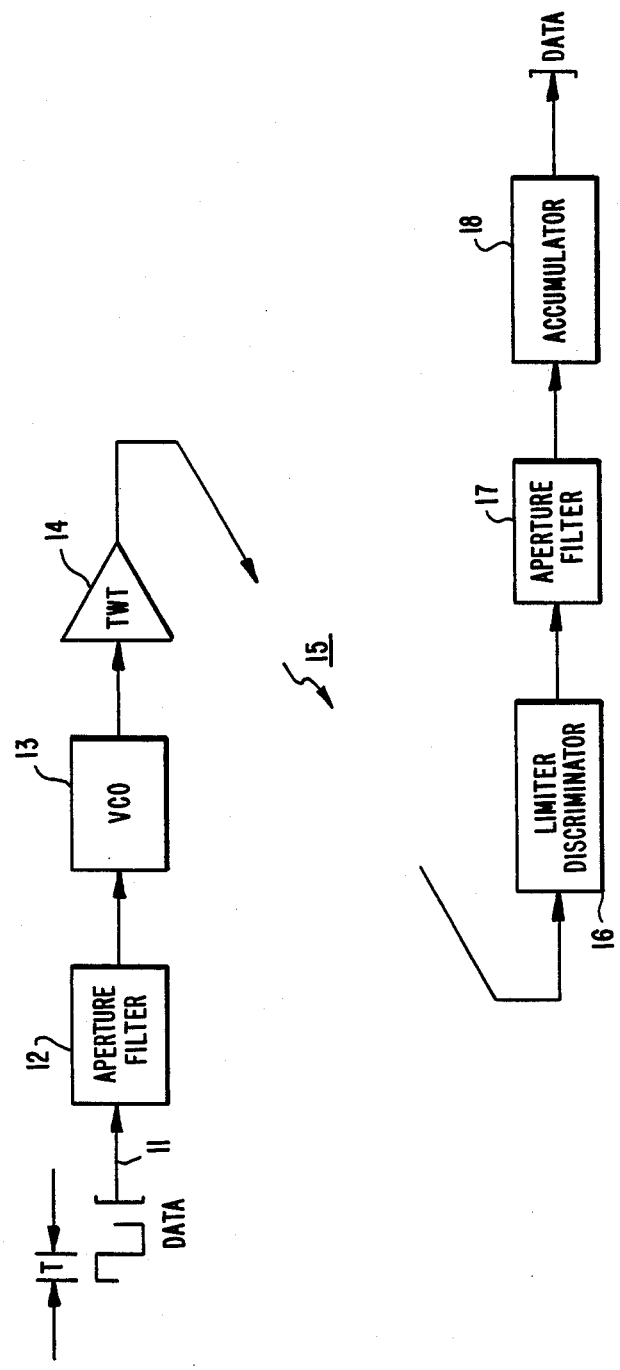
FIG. 1 is a diagrammatic illustration of a conventional continuous phase modulation/demodulation digital data communication system.

Before describing in detail the particular improved continuous phase modulation/demodulation digital data communication system in accordance with the present invention, it should be observed that the present invention resides primarily in a novel structural combination of conventional communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional groupings, whereby the present invention may be more readily understood.

Figure 2:
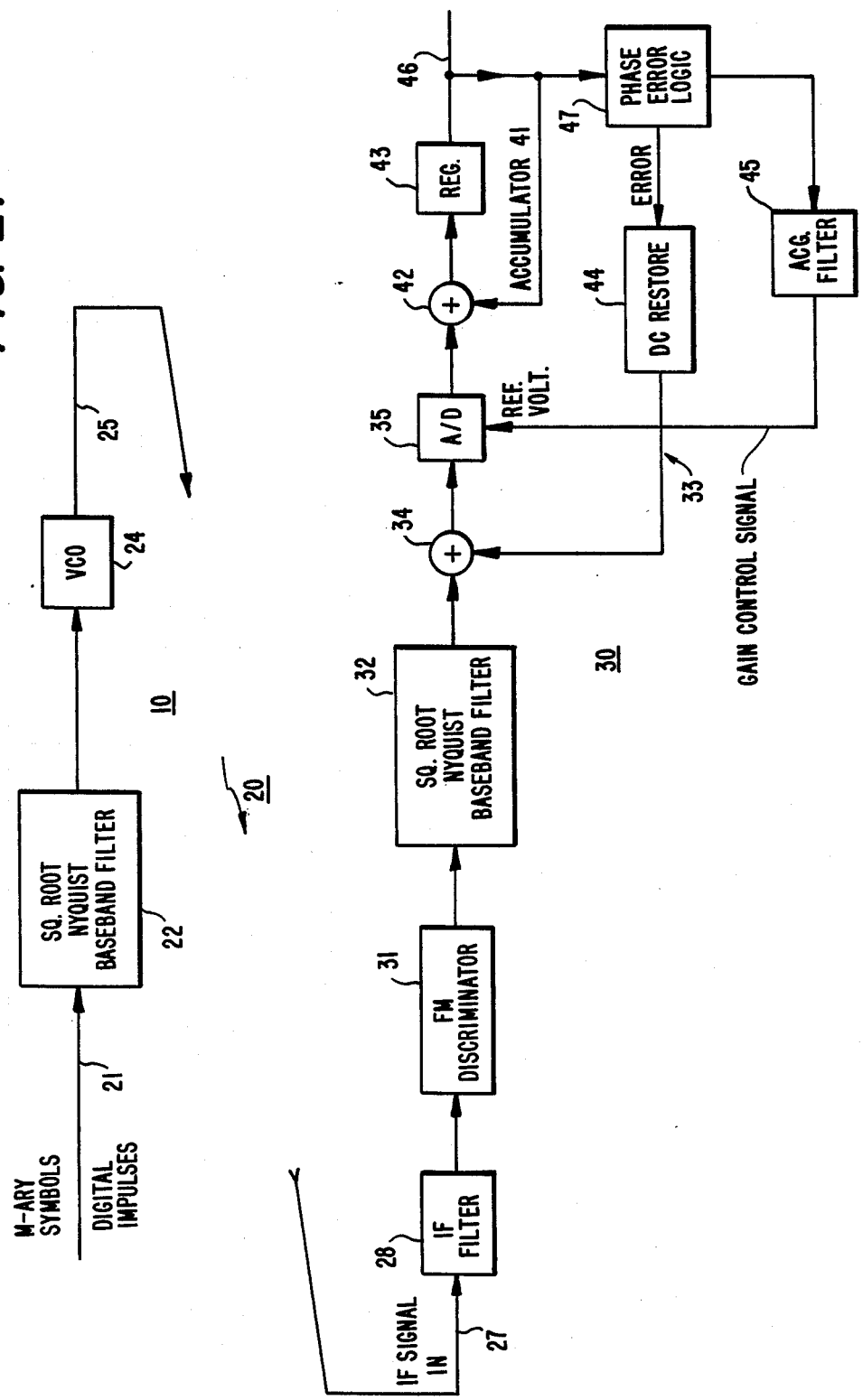
FIG. 2 is a diagrammatic illustration of a continuous phase modulation/demodulation digital data communication system employing square root Nyquist filters in accordance with an embodiment of the present invention.

Referring now to FIG. 2 of the drawings there is illustrated a block diagram of a communication system in accordance the present invention having a transmitter site 10, a communication link 20 and a receiver site 30. At transmitter site 10, digital data to be transmitted, such as M-ary encoded digital data symbols, is coupled over an input link 21 through a baseband square root Nyquist filter 22 to a voltage-to frequency converter modulator 24, shown as a voltage controlled oscillator (VCO). The output of modulator 24 is a varying frequency (phase) signal (frequency shift keyed (FSK)) representative of the digital data to be transmitted. This output signal is coupled over link 25 to an RF amplifier (not shown) and transmitted over communication channel (e.g. satellite link) 20 to receiver site 30.

At receiver site 30 incoming RF signals are downconverted to IF and coupled over link 27 through an IF filter 28 to an FM discriminator 31. Except for distortion introduced into the signal by the channel 20 and the IF filter 28 the output of FM discriminator 31 effectively corresponds to the baseband signal that was applied to modulator 24 at the transmitter site 10. Namely, absent distortion (intersymbol interference), the serial link from the input to modulator 24 to the output of discriminator 31 effectively appears to the baseband signal as a wire. The output of discriminator 31 is coupled to a second baseband square root Nyquist filter 32, the output of which is coupled to an accumulator section 33. (By virtue of the two square root Nyquist filters in the signal transmission path from the data input at the transmitter site to the data recovery output at the receiver site the resulting product of the two filtering mechanisms is simply a Nyquist function.)

Accumulator section 33 is preferably configured identically to the accumulator employed in the data recovery portion of the receiver described in the above-referenced Patent and comprises a summing circuit 34 which receives the output of filter 32 and the output of a D.C. restoration circuit 44. The output of summing circuit 34 is coupled to an analog/digital (A/D) converter 35, the reference control voltage for which is derived from the output of a gain control AGC filter 45. The output of A/D converter 35 is coupled to an accumulator circuit 41 comprised of an adder 42 and a register 43 which are connected in a closed loop, as shown. The output of register 43 is coupled to phase error logic circuit 47 the output of which is representative of a phase error correction voltage that is used to adjust the outputs of DC restoration circuit 44 and AGC filter 45. The output of accumulator 41 is coupled over output link 46 as the recovered M-ary digital data. For a more detailed description of the components and operation of accumulator section 33 attention may be directed to the above-referenced Patent. For purposes of the present description what is important is that the accumulator section provide a running summation of samples of the recovered signal (data and noise derived from Nyquist filter 32) as produced at the output of A/D converter 35, so as to take advantage of the negative correlation properties of the noise and thereby provide a substantial improvement in performance (on the order of 3 dB) as contrasted with a Nyquist-filtered system in which the accumulation function is absent.

More particularly, as can be seen from a comparison of the communication system of the present invention and the system of the above-reference Patent, circuit-wise, the only difference between the two systems lies in the type of baseband filtering mechanism employed in the transmitter and receiver sites. However, from a functional standpoint, the purpose of each of the two types of filters is totally different from the other and, consequently, the use of the accumulation function (as employed in the patented system) in a Nyquist-filtered configuration is unexpected. This difference may be best understood by reference to FIGS. 3 and 6, which show the respective impulse responses of the aperture filters employed in the communication system of FIG. 1 and the Nyquist filters employed in the communication system of the present invention shown in FIG. 2, and FIGS. 4 and 5, which show the respective frequency response characteristics produced of the radiated energy of the transmitted signal for the respective systems.

Figure 3:
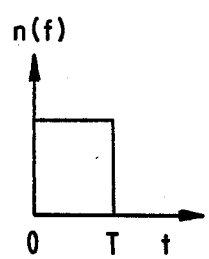
FIG. 3 is a diagram of the impulse response of an aperture filter employed in the communication system shown in FIG. 1.

As shown in FIG. 3 an aperture filter has a finite (effectively rectangular) impulse response having a constant throughput level over a prescribed timespan (T) corresponding to the pulse repetition rate of the digital data signal. As a consequence, at the output of the demodulator (limiter/discriminator) it is necessary to perform an integration of the baseband signal which, as noted supra, is of the form $kd\Phi/dt$. The accumulation function (implemented as an integrate and dump mechanism carried out for some number of successive sampling times T) produces an output representative of the accumulated phase and thereby a representation of the original data.

Figure 4:
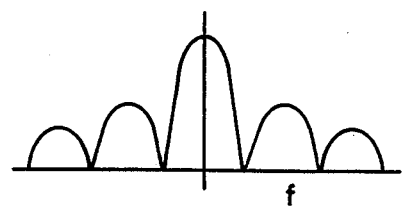
FIG. 4 is a diagram of the impulse frequency response of an aperture filter having the impulse response shown in FIG. 3.

Because of the finite nature of its impulse response the frequency response of the aperture filter has a characteristic in the form of a main lobe centered at the carrier frequency and a plurality of adjacent sidelobes of substantial amplitudes, as shown in FIG. 4. In a communication link, such as a narrowband satellite channel, these sidelobes severely limit the extent (closeness) to which information channels may be confined (stacked) and thereby they restrict the utilization efficiency of the communication link.

Figure 5:
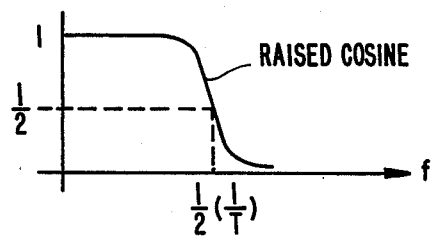
FIG. 5 is a diagram of the frequency response of a Nyquist filter employed in the communication system shown in FIG. 2.
Figure 6:
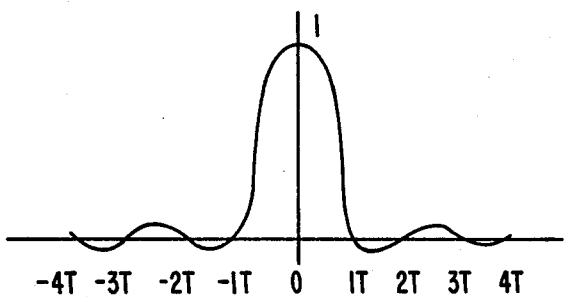
FIG. 6 is a diagram of the impulse response of a Nyquist filter employed in the communication system shown in FIG. 2.

In accordance with the present invention, however, the use of a Nyquist filter function, such as a raised cosine frequency response shown in FIG. 5, produces an impulse response which, as shown in FIG. 6, has a main lobe of (normalized) unity value at t=0, crossing the zero axis of T and a plurality of alternate polarity ripple components crossing the zero axis at successive intervals corresponding to integral multiples of the inverse of the pulse repetition rate. Consequently, the substantial sidelobe problem associated with the use of aperture filters is avoided, making it possible to more closely stack adjacent information channels without subjecting the channels to interference. Moreover, by incorporating an output accumulator, such as the accumulation function employed in the system described in the above-referenced patent in order to recover the original data through a summation of successive phase-representative samples, the performance of the communication system of the present invention is substantially improved (on the order of 3 dB) as contrasted with a Nyquist-filtered system absent the accumulator.

More specifically, my investigation into the signal and noise characteristics of the channel has revealed that the spectrum of the FM noise in the output of the discriminator is parabolic. This FM noise frequency dependency means that there is a correlation between the A/D noisy samples input to the accumulator. As the correlation is actually negative, then summing successive samples yields a reduction in the noise component of the recovered data.

As will be appreciated from the foregoing description, through the combination of a Nyquist filtering mechanism (equally split between the transmit and receive sites) and an accumulator function in the data recovery process, the communication system of the present invention is able to make more efficient use of a narrowband communication channel (by more closely stacking information channels without unwanted interference) and is able to substantially reduce the noise variance (resulting from the accumulation of the filtered baseband output samples).

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use in a communication system wherein frequency modulated signals, representative of information signals that have been transmitted from a transmitter site over a communications link, are demodulated at a receiver, a method of enhancing the characteristics of the recovered information signals comprising the steps of:
   (a) filtering the demodulated information signals by way of a Nyquist filtering mechanism; and
   (b) accumulating successive samples of the filtered demodulated signals, so as to derive information output signals having reduced noise signal content.

2. A method according to claim 1, wherein said transmitter site contains a Nyquist filtering mechanism through which said information signals have been filtered in the course of generating said frequency modulated signals that have been transmitted over said communications link.

3. A method according to claim 2, wherein said receiver contains a frequency discriminator through which said frequency modulated signals are demodulated prior to being filtered in accordance with a step (a).

4. A method according to claim 2, wherein each of the Nyquist filtering mechanisms at the transmitter and receiver sites comprises a square root Nyquist filter.

5. A method according to claim 4, wherein said square root Nyquist filter comprises a square root raised cosine filter.

6. A method according to claim 1, wherein said information signals comprise digital data signals.

7. A method according to claim 5, wherein said frequency modulated signals comprise M-ary encoded continuous phase frequency shift keyed signals.

8. A method according to claim 1, wherein step (b) accumulates successive samples of demodulated information signals over a plurality of sampling intervals the periods of which correspond to integral multiples of the inverse of the data repetition rate of the information signals.

9. For use in a communication system wherein frequency modulated signals, representative of information signals that have been transmitted from a transmitter site over a communications link, are demodulated at a receiver, an arrangement for enhancing the characteristics of the recovered information signals comprising:
   first means, coupled to receive the demodulated information signals, for filtering said demodulated information signals by way of a Nyquist filtering mechanism; and
   second means, coupled to receive the Nyquist-filtered signals produced by said first means, for accumulating successive samples of the filtered demodulated signals, so as to derive information output signals having reduced noise signal content.

10. An arrangement according to claim 9, wherein said transmitter site contains a Nyquist filtering mechanism through which said information signals have been filtered in the course of generating said frequency modulated signals that have been transmitted over said communications link.

11. An arrangement according to claim 10, wherein said receiver contains a frequency discriminator through which said frequency modulated signals are demodulator prior to being filtered by said first means.

12. An arrangement according to claim 10, wherein each of the Nyquist filtering mechanisms at the transmitter and receiver sites comprises a square root Nyquist filter.

13. An arrangement according to claim 12, wherein said square root Nyquist filter comprises a square root raised cosine filter.

14. An arrangement according to claim 9, wherein said information signals comprise digital data signals.

15. An arrangement according to claim 13, wherein said frequency modulated signals comprise M-ary encoded continuous phase frequency shift keyed signals.

16. An arrangement according to claim 9, wherein said second means accumulates successive samples accumulates successive samples of demodulated signals over a plurality of sampling intervals the periods of which correspond to integral multiples of the inverse of the data repetition rate of the information signals.

* * * * *